United States Patent
Yu

(10) Patent No.: US 11,295,099 B2
(45) Date of Patent: Apr. 5, 2022

(54) METHOD FOR READING ULTRAHIGH FREQUENCY RFID TAGS

(71) Applicant: WUXI HYESOFT SOFTWARE TECHNOLOGY CO., LTD., Jiangsu (CN)

(72) Inventor: Liqun Yu, Jiangsu (CN)

(73) Assignee: WUXI HYESOFT SOFTWARE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/281,246

(22) PCT Filed: Jul. 22, 2019

(86) PCT No.: PCT/CN2019/097001
§ 371 (c)(1),
(2) Date: Mar. 30, 2021

(87) PCT Pub. No.: WO2020/024823
PCT Pub. Date: Feb. 6, 2020

(65) Prior Publication Data
US 2022/0004726 A1    Jan. 6, 2022

(30) Foreign Application Priority Data

Aug. 2, 2018   (CN) .......................... 201810867413.8

(51) Int. Cl.
*G06K 7/08*     (2006.01)
*G06K 7/10*     (2006.01)

(52) U.S. Cl.
CPC ................ *G06K 7/10415* (2013.01)

(58) Field of Classification Search
CPC .................................................. G06K 7/10415
USPC ................................................. 235/451, 492
See application file for complete search history.

(56) References Cited

U.S. PATENT DOCUMENTS

| | | | |
|---|---|---|---|
| 2005/0040934 A1* | 2/2005 | Shanton | H04L 67/125 340/5.92 |
| 2005/0212673 A1* | 9/2005 | Forster | H04K 3/43 340/572.7 |
| 2018/0025266 A1* | 1/2018 | Sakurai | G06K 7/10316 340/10.1 |

FOREIGN PATENT DOCUMENTS

| | | |
|---|---|---|
| CN | 101604372 A | 12/2009 |
| CN | 103366199 A | 10/2013 |
| CN | 107665320 A | 2/2018 |

* cited by examiner

*Primary Examiner* — Jamara A Franklin

(57) ABSTRACT

A method for reading ultrahigh frequency RFID (Radio Frequency Identification) tags is provided, wherein: an ultrahigh frequency RFID scanning system includes an ultrahigh frequency RFID reader and an antenna group; antennas are distributed around a scanned object; the RFID tags are in the scanned object; the ultrahigh frequency RFID scanning system continuously scans the scanned object, till no new data is added to a scan set A, and then counting is started; if no new data is added to the scan set A for N consecutive scan cycles, it is considered that the ultrahigh frequency RFID scanning system has read all the RFID tags in the scanned object. The present invention overcomes the problem that neither the setting of "reading time" nor the setting of "number of times of reading" can determine whether the ultrahigh frequency RFID scanning system has actually read all the RFID tags.

2 Claims, 1 Drawing Sheet

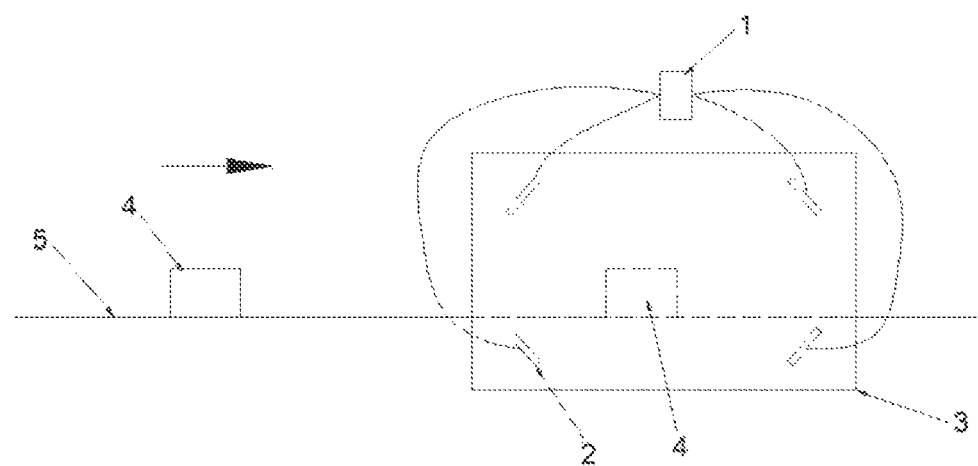

METHOD FOR READING ULTRAHIGH FREQUENCY RFID TAGS

BACKGROUND OF THE PRESENT INVENTION

Field of Invention

The present invention relates to a technical field of radio frequency identification, and more particularly to a method for reading ultrahigh frequency RFID (Radio Frequency Identification) tags.

Description of Related Arts

Ultrahigh frequency RFID (Radio Frequency Identification) tag reading is frequently used in the supply chain and the field of circulation. For example, it is necessary to scan the RFID tags in a packing box, so as to determine which products are in the packing box. The quantity of reading result and the reading efficiency are extremely important.

There are two conventional methods for judging whether all the ultrahigh frequency RFID tags are read, respectively through setting a reading time and setting a number of times of reading.

For the method through setting the reading time, for example, the reading time is set as 3 seconds, 5 seconds or 10 seconds, and the antennas continuously read the RFID tags; when reaching the set reading time, it is considered that all the RFID tags are read. The disadvantage of the above method is that: the quantity of the RFID tags in each packing box is different; the more RFID tags need the longer reading time; the fewer RFID tags need the shorter reading time. If the same reading time is set, for the packing box having more RFID tags, the reading time is not enough, and the RFID tags might not be completely read; for the packing box having fewer RFID tags, the reading time is wasted.

For the method through setting the number of times of reading, after the system sets the algorithm of cycle reading times, it is considered that all the RFID tags are read. In the case of set reading times, if the quantity of the RFID tags is large, it still cannot determine whether all the RFID tags are read. The above method can refer to the Chinese patent application of CN 201610604749.6 (see claim 13).

SUMMARY OF THE PRESENT INVENTION

The present invention aims at solving a technical problem that how to determine whether all RFID (Radio Frequency Identification) tags are read. The present invention adopts technical solutions as follows.

A method for reading ultrahigh frequency RFID tags is provided, wherein: an ultrahigh frequency RFID scanning system comprises an ultrahigh frequency RFID reader and an antenna group; the antenna group comprises at least two antennas; the antennas are distributed around a scanned object; the RFID tags are in the scanned object; and the antennas are respectively connected to the ultrahigh frequency RFID reader through feeders;

the method comprises steps of: setting a scan set A of a quantity of the RFID tags in the scanned object; adding new data of every scan cycle to the scan set A; continuously scanning the scanned object by the ultrahigh frequency RFID scanning system, till no new data is added to the scan set A, and then starting counting; wherein: if no new data is added to the scan set A for N consecutive scan cycles, it is considered that the ultrahigh frequency RFID scanning system has read all the RFID tags in the scanned object; if new data is added to the scan set A in any one of N consecutive scan cycles, counting is restarted, till no new data is added to the scan set A for N consecutive scan cycles, and it is considered that the ultrahigh frequency RFID scanning system has read all the RFID tags in the scanned object.

Preferably, the number N of consecutive scan cycles is adjusted according to the quantity of the RFID tags in the scanned object or reading difficulty of the RFID tags.

Preferably, before scanning, the ultrahigh frequency RFID scanning system presets the number N of consecutive scan cycles; and the number N of consecutive scan cycles is a natural number ranging from 3 to 20.

Preferably, the antennas are arranged in a tunnel machine; the scanned object is arranged on a conveyor line; the conveyor line passes through the tunnel machine; and the method for reading the ultrahigh frequency RFID tags is embedded in the ultrahigh frequency RFID scanning system.

Preferably, a detecting device is arranged on the conveyor line; the detecting device estimates the quantity of the RFID tags in the scanned object and feeds an estimated result back to the ultrahigh frequency RFID reader; according to the estimated result, the ultrahigh frequency RFID reader selects an appropriate number N of consecutive scan cycles.

The present invention has advantages as follows. The reading method provided by the present invention overcomes the problem that neither the setting of "reading time" nor the setting of "number of times of reading" can determine whether the ultrahigh frequency RFID scanning system has actually read all the RFID tags. According to the reading method provided by the present invention, the reading time and the number of times of reading are dynamically adjusted with the quantity of the RFID tags and the reading difficulty of the RFID tags, which not only ensures the accuracy of reading quantity, but also improves the reading efficiency.

BRIEF DESCRIPTION OF THE DRAWINGS

The FIGURE is a sketch view of an ultrahigh frequency RFID (Radio Frequency Identification) scanning system according to a preferred embodiment of the present invention.

In the FIGURE: 1: ultrahigh frequency RFID reader; 2: antenna; 3: tunnel machine; 4: scanned object; and 5: conveyor line.

DETAILED DESCRIPTION OF THE PREFERRED EMBODIMENT

According to the preferred embodiment of the present invention, a method for reading ultrahigh frequency RFID (Radio Frequency Identification) tags is provided, wherein: an ultrahigh frequency RFID scanning system comprises an ultrahigh frequency RFID reader 1 and an antenna group; the antenna group comprises at least two antennas 2; the antennas 2 are distributed around a scanned object 4; the RFID tags are in the scanned object 4; and the antennas 2 are respectively connected to the ultrahigh frequency RFID reader 1 through feeders;

the method comprises steps of: setting a scan set A of a quantity of the RFID tags in the scanned object 4; adding new data of every scan cycle to the scan set A; continuously scanning the scanned object 4 by the ultrahigh frequency RFID scanning system, till no new data is added to the scan set A, and then starting counting; wherein: if no new data is added to the scan set A for N consecutive scan cycles, it is considered that the ultrahigh frequency RFID scanning system has read all the RFID tags in the scanned object 4; if new data is added to the scan set A in any one of N consecutive scan cycles, counting is restarted, till no new data is added to the scan set A for N consecutive scan cycles, and it is considered that the ultrahigh frequency RFID scanning system has read all the RFID tags in the scanned object 4.

Furthermore, the number N of consecutive scan cycles is adjusted according to the quantity of the RFID tags in the scanned object 4 or reading difficulty of the RFID tags.

Furthermore, before scanning, the ultrahigh frequency RFID scanning system presets the number N of consecutive scan cycles; and the number N of consecutive scan cycles is a natural number ranging from 3 to 20.

Furthermore, the antennas 2 are arranged in a tunnel machine 3; the scanned object 4 is arranged on a conveyor line 5; the conveyor line 5 passes through the tunnel machine 3; and the method for reading the ultrahigh frequency RFID tags is embedded in the ultrahigh frequency RFID scanning system.

Furthermore, a detecting device is arranged on the conveyor line 5; the detecting device estimates the quantity of the RFID tags in the scanned object 4 and feeds an estimated result back to the ultrahigh frequency RFID reader 1; according to the estimated result, the ultrahigh frequency RFID reader 1 selects an appropriate number N of consecutive scan cycles.

The present invention is further illustrated with an example of scanning an object on the conveyor line as follows.

Referring to the FIGURE, the tunnel machine 3 is arranged on the conveyor line 5; the ultrahigh frequency RFID scanning system is arranged in the tunnel machine 3; the ultrahigh frequency RFID scanning system comprises the ultrahigh frequency RFID reader 1 and the antenna group; the ultrahigh frequency RFID reader 1 is arranged on the tunnel machine 3; the antennas 2 are respectively connected to the ultrahigh frequency RFID reader 1 through the feeders; the scanned object 4 is a carton; different quantity of products (such as clothes, wherein each of the clothes is provided with the RFID tag) are placed in each carton.

The RFID tags are cyclically read by the antenna group; one reading cycle is set as a scan cycle of the ultrahigh frequency RFID reader (scan cycle for short).

Before the carton passes through the tunnel machine 3, the ultrahigh frequency RFID scanning system presets the number N of consecutive scan cycles, or the detecting device (such as the weighing device) estimates the quantity of the RFID tags in the carton and then an appropriate number N of consecutive scan cycles is selected.

When the carton passes through the tunnel machine 3, the carton stays for a short time.

The scan set A of the quantity of the RFID tags in the carton is set; the new data of every scan cycle is added to the scan set A; the ultrahigh frequency RFID scanning system continuously scans the carton, till no new data is added to the scan set A, and then counting is started; if no new data is added to the scan set A for N consecutive scan cycles, it is considered that the ultrahigh frequency RFID scanning system has read all the RFID tags in the carton; if new data is added to the scan set A in any one of N consecutive scan cycles, counting is restarted, till no new data is added to the scan set A for N consecutive scan cycles, and it is considered that the ultrahigh frequency RFID scanning system has read all the RFID tags in the carton.

The number N of consecutive scan cycles is adjusted according to the quantity of the RFID tags in the scanned object 4 or reading difficulty of the RFID tags.

After scanning is completed, the carton is removed through the conveyor line.

What is claimed is:

1. A method for reading ultrahigh frequency RFID (Radio Frequency Identification) tags in a scanned object, wherein: an ultrahigh frequency RFID scanning system comprises an ultrahigh frequency RFID reader (1) and an antenna group; the antenna group comprises at least two antennas (2); the antennas (2) are distributed around the scanned object (4); the RFID tags are in the scanned object (4); the antennas (2) are respectively connected to the ultrahigh frequency RFID reader (1) through feeders; a quantity of the RFID tags placed in each scanned object (4) is different; the antennas (2) are arranged in a tunnel machine (3); the scanned object (4) is arranged on a conveyor line (5); the conveyor line (5) passes through the tunnel machine (3); and the method for reading the ultrahigh frequency RFID tags is embedded in the ultrahigh frequency RFID scanning system;

the method comprises steps of: setting a scan set A of the quantity of the RFID tags in the scanned object (4); adding new data of every scan cycle to the scan set A; continuously scanning the scanned object (4) by the ultrahigh frequency RFID scanning system, till no new data is added to the scan set A, and then starting counting; wherein: if no new data is added to the scan set A for N consecutive scan cycles, it is considered that the ultrahigh frequency RFID scanning system has read all the RFID tags in the scanned object (4); if new data is added to the scan set A in any one of N consecutive scan cycles, counting is restarted, till no new data is added to the scan set A for N consecutive scan cycles, and it is considered that the ultrahigh frequency RFID scanning system has read all the RFID tags in the scanned object (4); wherein: the number N of consecutive scan cycles is adjusted according to the quantity of the RFID tags in the scanned object (4) or reading difficulty of the RFID tags; a detecting device is arranged on the conveyor line (5); the detecting device estimates the quantity of the RFID tags in the scanned object (4) and feeds an estimated result back to the ultrahigh frequency RFID reader (1); according to the estimated result, the ultrahigh frequency RFID reader (1) selects an appropriate number N of consecutive scan cycles.

2. The method, as recited in claim 1, wherein: before scanning, the ultrahigh frequency RFID scanning system presets the number N of consecutive scan cycles; and the number N of consecutive scan cycles is a natural number ranging from 3 to 20.

* * * * *